United States Patent
Inomata et al.

(10) Patent No.: US 9,511,775 B2
(45) Date of Patent: Dec. 6, 2016

(54) VEHICLE CONTROL DEVICE WITH ABNORMALITY JUDGMENT UNIT FOR TRAVELING JUDGMENT SIGNALS

(71) Applicant: HONDA MOTOR CO., LTD., Tokyo (JP)

(72) Inventors: Takayuki Inomata, Utsunomiya (JP); Katsuyasu Yamane, Tochigi-ken (JP); Masayuki Yamazaki, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/570,405

(22) Filed: Dec. 15, 2014

(65) Prior Publication Data
US 2015/0166074 A1 Jun. 18, 2015

(30) Foreign Application Priority Data

Dec. 18, 2013 (JP) ................................ 2013-261135

(51) Int. Cl.
*B60W 40/10* (2012.01)
*B60W 40/105* (2012.01)
(Continued)

(52) U.S. Cl.
CPC ............ *B60W 40/10* (2013.01); *B60W 40/105* (2013.01); *B60W 30/18018* (2013.01);
(Continued)

(58) Field of Classification Search
None
See application file for complete search history.

(56) References Cited

U.S. PATENT DOCUMENTS

| 5,948,037 A | 9/1999 | Muraki | |
|---|---|---|---|
| 2001/0027362 A1* | 10/2001 | Nishida | G05B 9/02 |
| | | | 701/29.7 |
| 2013/0066507 A1* | 3/2013 | Yamane | B60R 16/0232 |
| | | | 701/22 |

FOREIGN PATENT DOCUMENTS

| DE | 19807057 | 8/1998 |
|---|---|---|
| JP | 01-145705 | 10/1989 |

(Continued)

OTHER PUBLICATIONS

German Office Action dated Feb. 14, 2016, English translation included.

(Continued)

*Primary Examiner* — Rami Khatib
*Assistant Examiner* — Jeffrey Boomer
(74) *Attorney, Agent, or Firm* — Rankin, Hill & Clark LLP

(57) ABSTRACT

A vehicle control device equipped with a vehicle state switching control unit for permitting an on/off switching control of an onboard device or a start/stop switching control of a drive source by a normal pressing operation of a start/stop switch SSSW when the vehicle is currently stopped, and for prohibiting a STOP control of the drive source by the normal pressing operation of the start/stop switch SSSW and permitting the STOP control of the drive source by a special pressing operation of the start/stop switch SSSW when the vehicle is currently traveling. A traveling judgment unit judges that the vehicle is currently stopped, if an abnormality has occurred in at least one of a plurality of signals, and all of the signals, which have been judged not to be abnormal, are stop signals.

6 Claims, 5 Drawing Sheets

(51) Int. Cl.
  *B60W 30/18*    (2012.01)
  *F02N 11/08*    (2006.01)
  *B60W 50/02*    (2012.01)

(52) U.S. Cl.
  CPC . *B60W 2050/0215* (2013.01); *B60W 2520/04* (2013.01); *B60W 2520/10* (2013.01); *B60W 2520/26* (2013.01); *F02N 11/0803* (2013.01); *F02N 11/0807* (2013.01); *F02N 11/0818* (2013.01); *F02N 11/0822* (2013.01); *F02N 11/0833* (2013.01); *F02N 2200/0801* (2013.01); *F02N 2200/102* (2013.01)

(56) References Cited

FOREIGN PATENT DOCUMENTS

| JP | 2003-182474 | 7/2003 | | |
|---|---|---|---|---|
| JP | 2005-140015 | 6/2005 | | |
| JP | WO2011142203 A1 * | 4/2011 | ............ | B60R 25/02 |
| JP | 2012-153329 | 8/2012 | | |
| JP | 2013-043575 | 3/2013 | | |

OTHER PUBLICATIONS

German Search Report dated Feb. 14, 2016, English translation included.
German Office Action dated Feb. 4, 2016, English translation included.
German Search Report dated Feb. 4, 2016, English translation included.
Japanese Office Action dated May 10, 2016, Application No. 2013-261135, partial English translation included.

* cited by examiner

VEHICLE CONTROL DEVICE WITH ABNORMALITY JUDGMENT UNIT FOR TRAVELING JUDGMENT SIGNALS

CROSS-REFERENCE TO RELATED APPLICATION

This application is based upon and claims the benefit of priority from Japanese Patent Application No. 2013-261135 filed on Dec. 18, 2013, the contents of which are incorporated herein by reference.

BACKGROUND OF THE INVENTION

Field of the Invention

The present invention relates to a vehicle control device equipped with a push switch disposed in a vehicle cabin that can be operated when pressed by a driver, and a traveling judgment unit for judging whether the vehicle is currently traveling or is currently stopped.

Description of the Related Art

Heretofore, a so-called smart key system has been known in which wireless communications are carried out between a portable electronic key and a vehicle control device to check and verify ID information. With such a smart key system, verification of the ID information and switching of vehicle states can be carried out by means of a pressing operation performed on a push switch (SSSW: Start/Stop Switch) that is disposed in the vehicle cabin.

This type of vehicle control device judges whether the vehicle is currently traveling or is currently stopped based on predetermined traveling judgment signals (a vehicle velocity signal or the like). Additionally, the vehicle control device permits a start/stop switching control of the vehicle engine (drive source) or an on/off switching control of an onboard device or accessory (ACC) in accordance with a normal pressing operation of a push switch, in the event it is judged that the vehicle is currently stopped.

Further, if it is judged that the vehicle is currently traveling, the vehicle control device prohibits a stop control to stop the engine by a normal pressing operation of the push switch from being carried out, and permits a stop control for stopping the engine by a special pressing operation of the push switch.

In a vehicle control device of this type, a technical concept has been proposed for handling an on failure and an off failure of the push switch using a momentary type of push switch having two contact points (see Japanese Laid-Open Patent Publication No. 2005-140015).

SUMMARY OF THE INVENTION

However, with the conventional technique, as disclosed in the aforementioned Japanese Laid-Open Patent Publication No. 2005-140015, only contact failures of the push switch are taken into consideration, and for example, nothing is considered concerning a case in which an abnormality occurs in the traveling judgment signals. Therefore, in the event that an abnormality occurs in the traveling judgment signals, it cannot be determined whether the vehicle is currently traveling or is currently stopped.

When an abnormality occurs in the traveling judgment signals, and in the case it is determined without exception that the vehicle is in a stopped state when, in actuality, the vehicle is currently traveling, the engine may disadvantageously be stopped by a normal pressing operation (mistaken operation) of the push switch.

On the other hand, when an abnormality occurs in the traveling judgment signals, and in the case it is determined without exception that the vehicle is currently traveling when, in actuality, the vehicle is currently stopped, the engine cannot be stopped unless the push switch is operated by a special pressing operation, and a problem arises in that user convenience cannot be ensured.

The present invention has been devised taking into consideration the aforementioned problems, and has the object of providing a vehicle control device, in which, even if an abnormality occurs in the traveling judgment signals, stopping of a drive source by mistaken operation of a push switch is prevented during a currently traveling condition of the vehicle, while at the same time, user convenience can be enhanced when the vehicle is currently stopped.

A vehicle control device according to the present invention comprises a push switch disposed in a vehicle cabin that can be operated when pressed by a driver, traveling judgment unit for judging whether the vehicle is currently traveling or is currently stopped, and vehicle state switching control unit for permitting an on/off switching control of an onboard device or a start/stop switching control of a drive source of the vehicle by a normal pressing operation of the push switch, if it is judged by the traveling judgment unit that the vehicle is currently stopped, and for prohibiting a stop control of the drive source by the normal pressing operation of the push switch and permitting a stop control of the drive source by a special pressing operation of the push switch, if it is judged by the traveling judgment unit that the vehicle is currently traveling. The vehicle control device further comprises abnormality judgment unit for judging whether an abnormality has occurred among a plurality of traveling judgment signals that are sent respectively from a plurality of units to the traveling judgment unit, and which indicate whether the vehicle is currently traveling or is currently stopped. The traveling judgment unit judges that the vehicle is currently stopped, if it is judged by the abnormality judgment unit that an abnormality has occurred in at least one of the plurality of traveling judgment signals, and all of the traveling judgment signals that have been judged not to be abnormal by the abnormality judgment unit are stop signals indicating that the vehicle is currently stopped.

According to the vehicle control device of the present invention, even if an abnormality occurs in at least one of the plurality of traveling judgment signals, if all of the traveling judgment signals that have been judged not to be abnormal by the abnormality judgment unit are stop signals, then it is judged that the vehicle is currently stopped. Consequently, the start/stop switching control of the drive source, or the on/off switching control of an onboard device can be carried out by a normal pressing operation of the push switch. More specifically, even in the event that an abnormality is generated in the traveling judgment signals, the vehicle state can be switched by a normal pressing operation and without the need for a special pressing operation of the push switch. Thus, in a currently stopped state of the vehicle, user convenience can be enhanced. Further, if it is judged by the traveling judgment unit that the vehicle is currently traveling, the stop control for stopping the drive source by a normal pressing operation of the push switch is prohibited. Consequently, even if an abnormality occurs in at least one of the plurality of traveling judgment signals, stopping of the drive source by mistaken operation of the push switch can be prevented during a currently traveling condition of the vehicle.

In the above-described vehicle control device, the traveling judgment unit may judge that the vehicle is currently traveling if it is judged by the abnormality judgment unit that an abnormality is occurring in at least one signal from among the plurality of traveling judgment signals, and at least one of the traveling judgment signals that has been judged not to be abnormal by the abnormality judgment unit is a traveling signal indicating that the vehicle is currently traveling.

According to such a configuration, since it is judged that the vehicle is currently traveling in the event that at least one of the traveling judgment signals in which an abnormality is not occurring is a traveling signal, stopping of the drive source by a mistaken operation of the push switch while the vehicle is currently traveling can be prevented.

In the above-described vehicle control device, the traveling judgment unit may judge that the vehicle is currently traveling if it is judged by the abnormality judgment unit that an abnormality is not occurring among all of the plurality of traveling judgment signals, and the traveling signals and the stop signals coexist within the plurality of traveling judgment signals.

According to such a configuration, since it is judged that the vehicle is currently traveling in the event that which one of the plurality of traveling judgment signals has a higher reliability is not known, stopping of the drive source by a mistaken operation of the push switch while the vehicle is currently traveling can be prevented.

In the above-described vehicle control device, the abnormality judgment unit may judge whether an abnormality is occurring in the traveling judgment signals, based on at least one of periodic updating of the traveling judgment signals being stopped, periodic transmission of the traveling judgment signals being disrupted, and the traveling judgment signals being of an abnormal value.

According to such a configuration, in a condition in which it is highly probable for an abnormality to be occurring in the traveling judgment signals, it can be judged that the traveling judgment signals are in fact suffering from an abnormality.

In the above-described vehicle control device, the plurality of traveling judgment signals may include at least one of a vehicle velocity signal and a wheel velocity signal.

According to such a configuration, since a general purpose signal (vehicle velocity signal, wheel velocity signal), which indicates directly whether the vehicle is currently traveling or is currently stopped, is used as the traveling judgment signal, a judgment of high reliability can be performed without increasing costs.

In the above-described vehicle control device, the plurality of units includes a first ECU that controls the drive source, and a second ECU that controls behavior of the vehicle.

According to such a configuration, without the need for newly providing a dedicated unit, the vehicle control device can be achieved at a low cost.

In accordance with the vehicle control device, even if an abnormality occurs in the traveling judgment signals, stopping of a drive source by mistaken operation of a push switch is prevented during a currently traveling condition of the vehicle, while at the same time, user convenience can be enhanced when the vehicle is currently stopped.

The above and other objects features and advantages of the present invention will become more apparent from the following description when taken in conjunction with the accompanying drawings, in which preferred embodiments of the present invention are shown by way of illustrative example.

DESCRIPTION OF THE PREFERRED EMBODIMENTS

Below, with reference to the accompanying drawings, preferred embodiments of a vehicle control device according to the present invention will be described in relation to a vehicle in which the vehicle control device is accommodated. In the following description, although an example is given of a vehicle which is driven by an engine as a drive source, the vehicle, which is equipped with the vehicle control device according to the present invention, is not limited to an engine driven vehicle and, for example, may be a hybrid vehicle, an electric vehicle, or the like.

(First Embodiment)

Figure 1:
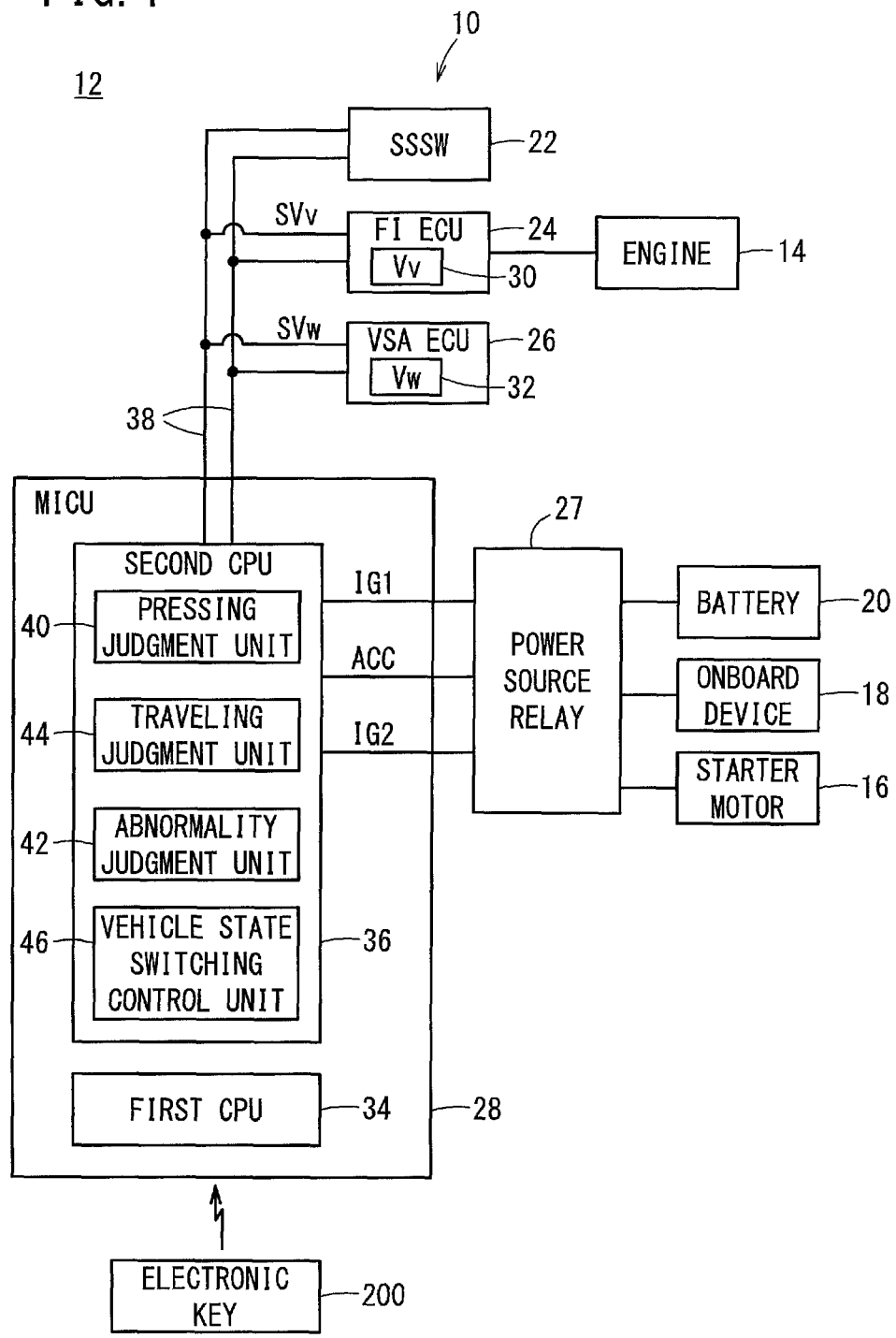
FIG. 1 is a block diagram of a vehicle equipped with a vehicle control device according to a first embodiment of the present invention.

As shown in FIG. 1, the vehicle 12 according to the present embodiment corresponds to a smart key system in which wireless communications are carried out with a portable electronic key 200 to check and verify ID information. More specifically, the vehicle 12 is equipped with a smart entry system and a smart start function. The smart entry function is a function that allows a door to be locked or unlocked if the ID information matches with that of the electronic key 200, whereas the smart start function is a function that enables starting of the drive source in the case that ID information matches with that of the electronic key 200.

The vehicle 12 includes an engine 14 that serves as a drive source, a starter motor 16 for starting the engine 14, an onboard device or accessory (ACC) 18 such as an audio device or the like (other than the starter motor 16), a battery 20 for supplying electric power to the starter motor 16 and the onboard device 18, and the vehicle control device 10.

The vehicle control device 10 includes a start/stop switch SSSW 22, which is constituted as a push switch, a fuel injection electronic control unit (FI ECU 24) serving as a first ECU, a vehicle behavior stabilizing electronic control unit (VSA ECU 26) serving as a second ECU, a power source relay 27, and a MICU (Multiplex Integrated Control Unit) 28.

The start/stop switch SSSW 22 is a push-type of switch, which is disposed in the vehicle cabin and is capable of being operated when pressed by the driver.

The FI ECU 24 serves to control driving of the engine 14 and includes a vehicle velocity sensor 30. The vehicle velocity sensor 30 calculates the vehicle velocity Vv [km/h] based on rotation of a non-illustrated transmission counter shaft, and outputs a vehicle velocity signal (traveling judgment signal) SVv corresponding to the vehicle velocity Vv.

The VSA ECU 26 constitutes part of a vehicle behavior stabilizing system (VSA system) and controls the VSA system in its entirety. The VSA system controls an antibraking system (ABS) for preventing locking of the vehicle wheels during braking, a traction control system (TCS) for preventing wheel racing during acceleration, and a side slip suppression system for suppressing lateral slippage during turning.

Furthermore, the VSA ECU 26 includes a wheel velocity sensor 32. The wheel velocity sensor 32 calculates the wheel velocity Vw [km/h] based on rotation of non-illustrated wheels of the vehicle, and outputs a wheel velocity signal (traveling judgment signal) SVw corresponding to the detected wheel velocity Vw.

The power source relay 27 places the connection path between the battery 20 and the starter motor 16 in a conductive state or a disconnected state, and further places the connection path between the battery 20 and the onboard device 18 in a conductive state or a disconnected state.

The MICU 28 includes the first CPU 34 and the second CPU 36. The first CPU 34 carries out wireless communications and matching of ID information with the portable electronic key 200. In addition, the first CPU 34 controls driving of power windows, wipers, or the like.

The second CPU 36 is connected respectively to the start/stop switch SSSW 22, the FI ECU 24, and the VSA ECU 26 through predetermined communication lines 38. According to the present embodiment, an F-CAN (Fast-Controller Area Network) having a pair of communication lines is used as the communication lines 38. By making use of such an F-CAN system, it is possible to perform data communications at a comparatively high speed while enhancing resistance to noise.

More specifically, through the communication lines 38, the second CPU 36 receives respective signals including the pressing signals that are transmitted from the start/stop switch SSSW 22, the vehicle velocity signals SVv that are transmitted from the FI ECU 24, and the wheel velocity signals SVw that are transmitted from the VSA ECU 26. In this case, each of the FI ECU 24 and the VSA ECU 26 transmits the vehicle velocity signals SVv and the wheel velocity signals SVw periodically.

The second CPU 36 includes a pressing judgment unit 40, an abnormality judgment unit 42, a traveling judgment unit 44, and a vehicle state switching control unit 46.

The pressing judgment unit 40 judges whether a normal pressing operation or a special pressing operation has been performed on the start/stop switch SSSW 22, based on a pressing signal that is sent from the start/stop switch SSSW 22. The normal pressing operation, for example, is set to a one-time pressing operation of the start/stop switch SSSW 22 that is carried out within a predetermined time period or less (short time period). The special pressing operation can be set, for example, to a one-time pressing operation of the start/stop switch SSSW 22, which is carried out over a period of time that is longer than the predetermined time period (e.g., three seconds or greater), or a continuous pressing operation by which the start/stop switch SSSW 22 is pressed multiple times (e.g., three times) each for a short period of time. However, it should be noted that the special pressing operation may be set to any arbitrary pressing operation that differs from the normal pressing operation.

The abnormality judgment unit 42 determines whether an abnormality is occurring in at least one of the vehicle velocity signal SVv and the wheel velocity signal SVw.

As shown in the following Table 1, the traveling judgment unit 44 determines whether the vehicle 12 is currently traveling or is currently stopped, based on the vehicle velocity signal SVv and the wheel velocity signal SVw. In Table 1, the indication "stop signal" is defined by a situation in which the vehicle velocity signal SVv corresponds to a vehicle velocity Vv of 0 [km/h], or a situation in which the wheel velocity signal SVw corresponds to a wheel velocity Vw of 0 [km/h]. The indication "traveling signal" is defined by a situation in which the vehicle velocity signal SVv corresponds to a vehicle velocity Vv other than 0 [km/h], or a situation in which the wheel velocity signal SVw corresponds to a wheel velocity Vw other than 0 [km/h]. Further, the indication "currently stopped (fault)" is defined by a situation in which the vehicle control device 10 is experiencing a failure and the vehicle 12 is currently stopped, and the indication "currently traveling (fault)" is defined by a situation in which the vehicle control device 10 is experiencing a failure and the vehicle 12 is currently traveling.

TABLE 1

| VEHICLE VELOCITY SIGNAL | WHEEL VELOCITY SIGNAL | JUDGMENT RESULT |
| --- | --- | --- |
| STOP SIGNAL | STOP SIGNAL | CURRENTLY STOPPED |
|  | TRAVELING SIGNAL | CURRENTLY TRAVELING (FAULT) |
|  | ABNORMAL | CURRENTLY STOPPED (FAULT) |
| TRAVELING SIGNAL | STOP SIGNAL | CURRENTLY TRAVELING (FAULT) |
|  | TRAVELING SIGNAL | CURRENTLY TRAVELING |
|  | ABNORMAL | CURRENTLY TRAVELING (FAULT) |
| ABNORMAL | STOP SIGNAL | CURRENTLY STOPPED (FAULT) |
|  | TRAVELING SIGNAL | CURRENTLY TRAVELING (FAULT) |
|  | ABNORMAL | CURRENTLY TRAVELING (FAULT) |

In the present embodiment, in the case that the traveling judgment unit 44 determines the "currently stopped (fault)" or the "currently traveling (fault)" state, the vehicle 12 may be constituted to cause a warning lamp to be illuminated on a display device such as a non-illustrated meter panel or the like. In this case, the user (the driver or a person performing maintenance, etc.) can easily be notified of a failure of the FI ECU 24 or the VSA ECU 26 or the like.

The vehicle state switching control unit 46 carries out a switching control between respective vehicle states (OFF state, ACC state, first ON state, second ON state), based on the judgment results of the pressing judgment unit 40 and the traveling judgment unit 44.

The OFF state is defined by a condition in which the engine 14 is stopped. The ACC state is defined by a condition in which power is supplied from the battery 20 to an onboard device 18 while the engine 14 is stopped. The first ON state is defined by a condition in which supply of power to the starter motor 16 from the battery 20 is stopped, and the engine 14 is being activated (current is being supplied to the ignition system of the engine 14). The second ON state is defined by a condition in which power is supplied from the battery 20 to the starter motor 16 for starting the engine 14.

The vehicle state switching control unit 46, by sending a predetermined signal ACC to the power source relay 27, carries out a switching control from the OFF state to the ACC state. Further, the vehicle state switching control unit 46, by sending a predetermined signal IG2 to the power source relay 27, carries out a switching control from the OFF state to the second ON state, and a switching control from the ACC state to the second ON state. Furthermore, the vehicle state switching control unit 46, by sending a predetermined signal IG1 to the power source relay 27, carries out a switching control from the second ON state to the first ON state.

The vehicle control device 10 according to the present embodiment is constructed basically as described above. Next, operations of the vehicle control device 10 will be described with reference to FIGS. 2 and 3. In the following description, an initial state is assumed in which wireless communications are carried out for matching of ID information between the portable electronic key 200 and the first CPU 34.

Figure 2:
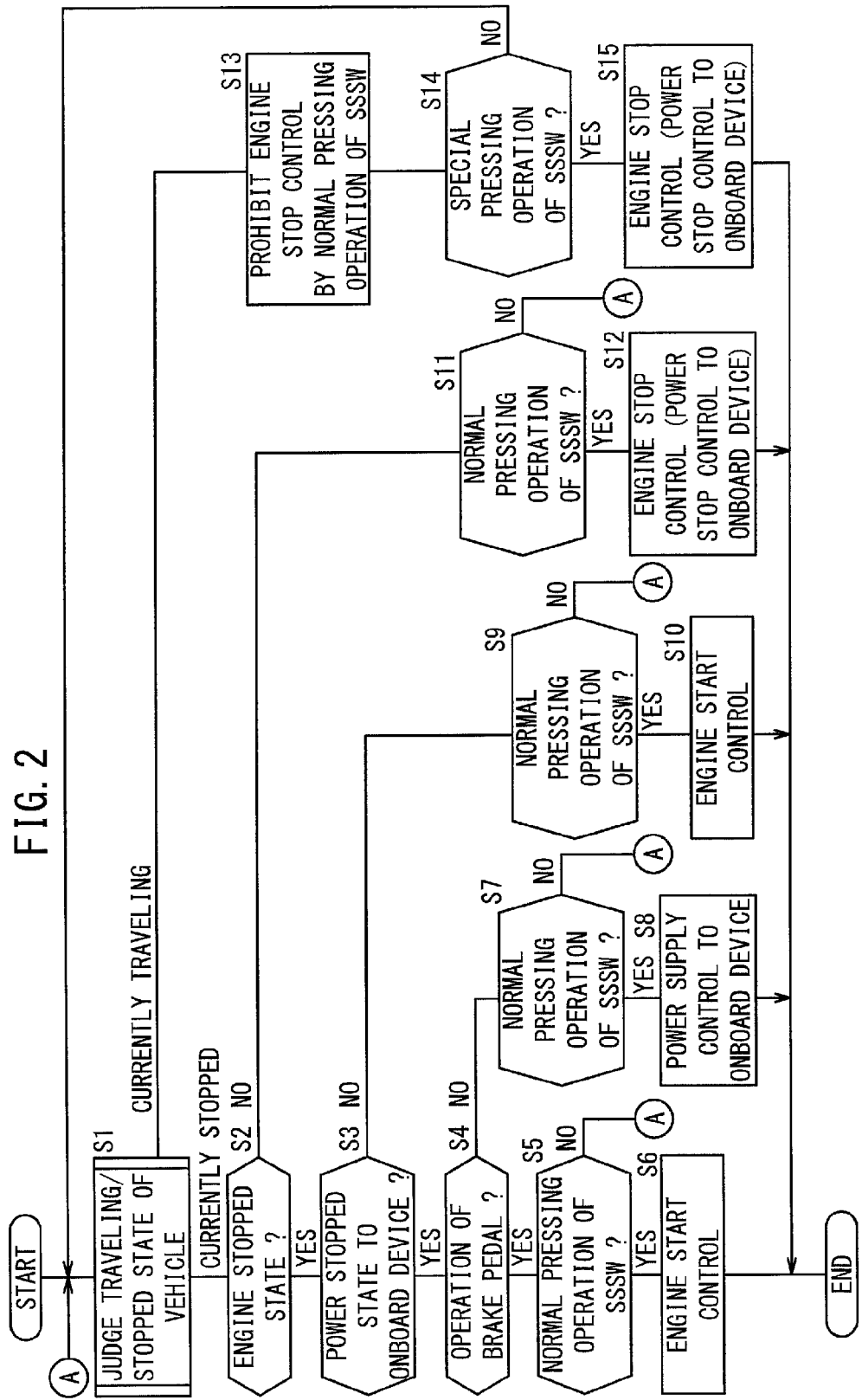
FIG. 2 is a first flowchart for describing operations of the vehicle control device of FIG. 1.
Figure 3:
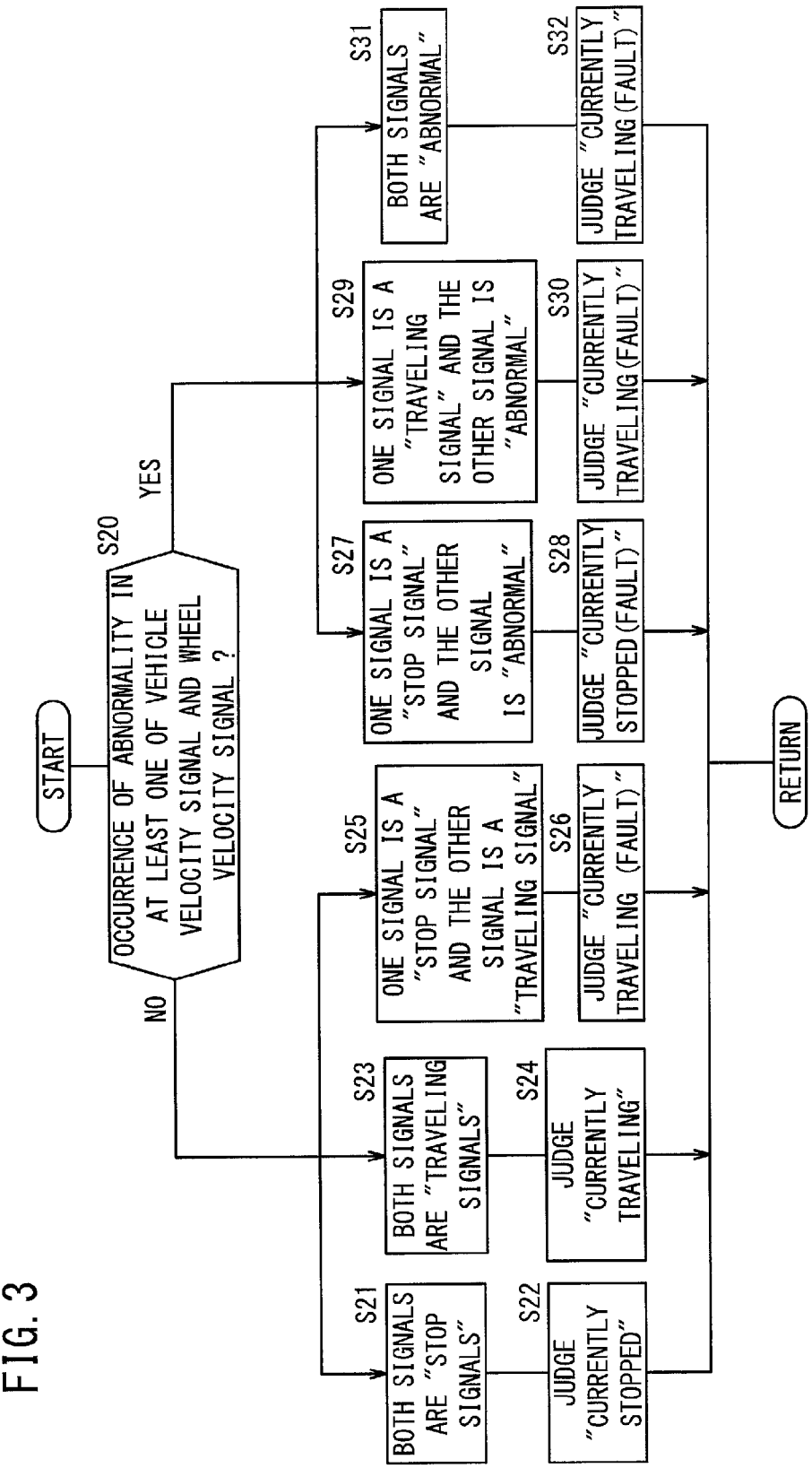
FIG. 3 is a second flowchart for describing operations of the vehicle control device of FIG. 1.

At first, in step S1 of FIG. 2, the traveling judgment unit 44 determines whether the vehicle 12 is currently traveling or is currently stopped (traveling/stopped condition of the vehicle 12). More specifically, the abnormality judgment unit 42 determines whether an abnormality is occurring in at least one of the vehicle velocity signal SVv and the wheel velocity signal SVw (step S20 of FIG. 3).

In greater detail, the abnormality judgment unit 42 determines whether an abnormality is occurring in the vehicle velocity signal SVv, based on at least one of periodic updating of the vehicle velocity signal SVv being stopped, periodic transmission of the vehicle velocity signal SVv being disrupted, and the vehicle velocity signal SVv being of an abnormal value. Further, the abnormality judgment unit 42 determines whether an abnormality is occurring in the wheel velocity signal SVw, based on at least one of periodic updating of the wheel velocity signal SVw being stopped, periodic transmission of the wheel velocity signal SVw being disrupted, and the wheel velocity signal SVw being of an abnormal value.

If it is judged by the abnormality judgment unit 42 that the vehicle velocity signal SVv and the wheel velocity signal SVw are not abnormal (step S20: NO), then the traveling judgment unit 44 determines the traveling/stopped condition of the vehicle 12 in the following manner.

More specifically, in the case that the vehicle velocity signal SVv and the wheel velocity signal SVw are both "stop signals," the traveling judgment unit 44 judges that the vehicle 12 is "currently stopped" (step S21 and step S22). Further, in the case that the vehicle velocity signal SVv and the wheel velocity signal SVw are both "traveling signals," the traveling judgment unit 44 judges that the vehicle 12 is "currently traveling" (step S23 and step S24). Furthermore, in the case that one of the vehicle velocity signal SVv and the wheel velocity signal SVw is a "stop signal" and the other is a "traveling signal" (in the case that the "stop signals" and the "traveling signals" are mixed), the traveling judgment unit 44 judges that the vehicle 12 is "currently traveling (fault)" (step S25 and step S26).

On the other hand, if it is judged by the abnormality judgment unit 42 that at least one of the vehicle velocity signal SVv and the wheel velocity signal SVw is abnormal (step S20: YES), then the traveling judgment unit 44 determines the traveling/stopped condition of the vehicle 12 in the following manner.

More specifically, in the case that one of the vehicle velocity signal SVv and the wheel velocity signal SVw is a "stop signal" and the other is "abnormal," the traveling judgment unit 44 judges that the vehicle 12 is "currently stopped (fault)" (step S27 and step S28). Further, in the case that one of the vehicle velocity signal SVv and the wheel velocity signal SVw is a "traveling signal" and the other is "abnormal," the traveling judgment unit 44 judges that the vehicle 12 is "currently traveling (fault)" (step S29 and step S30). Furthermore, in the case that the vehicle velocity signal SVv and the wheel velocity signal SVw are both "abnormal," the traveling judgment unit 44 judges that the vehicle 12 is "currently traveling (fault)" (step S31 and step S32).

If it is judged by the traveling judgment unit 44 that the vehicle 12 is currently stopped, the vehicle control device 10 determines whether the engine 14 is stopped (step S2 of FIG. 2). In addition, if the engine 14 is stopped, the vehicle control device 10 determines whether supply of power from the battery 20 to the onboard device 18 is in a power stopped state (step S3). Subsequently, if supply of power to the onboard device 18 is in a power stopped state (i.e., in the case of an OFF condition), the vehicle control device 10 determines whether a non-illustrated brake pedal is being operated (step S4). Next, if the brake pedal is being operated, the pressing judgment unit 40 determines whether a normal pressing operation is being applied to the start/stop switch SSSW 22 (step S5).

If it is judged by the pressing judgment unit 40 that the start/stop switch SSSW 22 is not being operated by a normal pressing operation, then the processes of step S1 and thereafter are implemented. If it is judged by the pressing judgment unit 40 that a normal pressing operation has been applied to the start/stop switch SSSW 22, then the vehicle state switching control unit 46 carries out an engine start control (step S6).

More specifically, by transmitting the signal IG2 to the power source relay 27, the vehicle state switching control unit 46 causes power from the battery 20 to be supplied to the starter motor 16. Consequently, since the starter motor 16 is driven, the engine 14 is started. More specifically, switching is performed from the OFF state to the second ON state. In addition, when the engine 14 is started, the vehicle state switching control unit 46 transmits the signal IG1 to the power source relay 27, whereby supply of power from the battery 20 to the starter motor 16 is stopped, and the FI ECU 24 carries out a drive control of the engine 14. Consequently, switching is performed from the second ON state to the first ON state. At this stage, the procedure of the flowchart taking place at this time is brought to an end.

In step S4, if the brake pedal is not being operated, the pressing judgment unit 40 determines whether a normal pressing operation is being applied to the start/stop switch SSSW 22 (step S7). If it is judged by the pressing judgment unit 40 that the start/stop switch SSSW 22 is not being operated by a normal pressing operation, then the processes of step S1 and thereafter are implemented. If it is judged by the pressing judgment unit 40 that a normal pressing operation has been applied to the start/stop switch SSSW 22, then the vehicle state switching control unit 46 carries out a power supply control to the onboard device 18 (step S8).

More specifically, by transmitting the signal ACC to the power source relay 27, the vehicle state switching control unit 46 causes power from the battery 20 to be supplied to the onboard device 18. Consequently, switching is performed from the OFF state to the ACC state. At this stage, the procedure of the flowchart taking place at this time is brought to an end.

In step S3, if a power supply condition to the onboard device 18 is taking place (i.e., if the ACC condition exists), the pressing judgment unit 40 determines whether the start/stop switch SSSW 22 is being subjected to a normal pressing operation (step S9).

If it is judged by the pressing judgment unit 40 that the start/stop switch SSSW 22 is not being operated by a normal pressing operation, then the processes of step S1 and thereafter are implemented. On the other hand, if it is judged by the pressing judgment unit 40 that a normal pressing operation has been applied to the start/stop switch SSSW 22, then the vehicle state switching control unit 46 carries out an engine start control (step S10). Consequently, after switching from the ACC state to the second ON state, switching is performed from the second ON state to the first ON state. The engine start control of step S10 basically is the same as that of step S6, and therefore, the details of this step are omitted.

In step S2, if the engine 14 is in a driven state (i.e., if the vehicle 12 is currently stopped in the first ON state), the pressing judgment unit 40 determines whether the start/stop switch SSSW 22 is being subjected to a normal pressing operation (step S11).

If it is judged by the pressing judgment unit 40 that the start/stop switch SSSW 22 is not being operated by a normal pressing operation, then the processes of step S1 and thereafter are implemented. On the other hand, if it is judged by the pressing judgment unit 40 that a normal pressing operation has been applied to the start/stop switch SSSW 22, then in step S12, the vehicle state switching control unit 46 carries out an engine stop control (and a control to stop supply of power to the onboard device 18).

More specifically, the vehicle state switching control unit 46 controls the FI ECU 24 to stop driving of the engine 14, and further controls the power source relay 27 to stop supply of power from the battery 20 to the onboard device 18. Consequently, switching is performed from the first ON state to the OFF state. At this stage, the procedure of the flowchart taking place at this time is brought to an end.

In step S1, if it is judged by the traveling judgment unit 44 that the vehicle 12 is currently traveling, the vehicle state switching control unit 46 prohibits the engine stop control by a normal operation of the start/stop switch SSSW 22 (step S13). Consequently, stopping of the engine 14 by a mistaken operation of the start/stop switch SSSW 22 during traveling of the vehicle 12 is prevented.

Thereafter, the pressing judgment unit 40 determines whether a special pressing operation has been applied to the start/stop switch SSSW 22 (step S14). If it is judged by the pressing judgment unit 40 that the start/stop switch SSSW 22 is not being operated by a special pressing operation, then the processes of step S1 and thereafter are implemented. On the other hand, if it is judged by the pressing judgment unit 40 that a special pressing operation has been applied to the start/stop switch SSSW 22, then in step S15, the vehicle state switching control unit 46 carries out an engine stop control (and a control to stop supply of power to the onboard device 18). Consequently, switching is performed from the first ON state to the OFF state. The engine stop control (and the control to stop supply of power to the onboard device 18) of step S15 basically are the same as that of step S12, and therefore, the details of this step are omitted. At this stage, the procedure of the flowchart taking place at this time is brought to an end.

According to the present embodiment, even if an abnormality has occurred in the vehicle velocity signal SVv or the wheel velocity signal SVw, if the signals that are not abnormal are "stop signals," then it is judged that the vehicle 12 is currently stopped (step S27 and step S28). Consequently, the start/stop switching control of the engine 14 (step S6, step S10, step S12), or the on/off switching control of the onboard device 18 (step S8 and step S12) can be carried out by a normal pressing operation of the start/stop switch SSSW 22. More specifically, even in the event that an abnormality is generated in the vehicle velocity signal SVv or the wheel velocity signal SVw, the vehicle state can be switched by a normal pressing operation and without the need for a special pressing operation of the start/stop switch SSSW 22. Thus, in a currently stopped state of the vehicle 12, user convenience can be enhanced.

Further, if it is judged by the traveling judgment unit 44 that the vehicle 12 is currently traveling (step S1), the stop control for stopping the engine 14 by a normal pressing operation of the start/stop switch SSSW 22 is prohibited (step S13). Consequently, even in the case that an abnormality is generated in the vehicle velocity signal SVv or the wheel velocity signal SVw, stopping of the engine 14 by a mistaken operation of the start/stop switch SSSW 22 during traveling of the vehicle 12 can be prohibited.

According to the present embodiment, even if an abnormality has occurred in the vehicle velocity signal SVv or the wheel velocity signal SVw, if the signals that are not abnormal are "traveling signals," then it is judged that the vehicle 12 is "currently traveling" (step S29 and step S30). Consequently, stopping of the engine 14 by a mistaken operation of the start/stop switch SSSW 22 during traveling of the vehicle 12 can be reliably prevented.

Further, in the case that one of the vehicle velocity signal SVv and the wheel velocity signal SVw is a "stop signal" and the other is a "traveling signal" (in the case that the "stop signals" and the "traveling signals" are mixed), it is determined that the vehicle 12 is "currently traveling" (step S25 and step S26). In this manner, since it is judged that the vehicle 12 is currently traveling in the event it is uncertain as to whether any one of the signals from among the vehicle velocity signal SVv and the wheel velocity signal SVw is of high reliability, stopping of the engine 14 by a mistaken operation of the start/stop switch SSSW 22 while the vehicle 12 is currently traveling can be prevented more reliably.

Furthermore, the abnormality judgment unit 42 determines whether an abnormality is occurring in the vehicle velocity signal SVv, based on at least one of periodic updating of the vehicle velocity signal SVv being stopped, periodic transmission of the vehicle velocity signal SVv being disrupted, and the vehicle velocity signal SVv being of an abnormal value. Further, by a similar method to that for the vehicle velocity signal SVv, the abnormality judgment unit 42 determines whether an abnormality is occurring in the wheel velocity signal SVw. In this manner, in a condition in which it is highly probable for an abnormality to be occurring in the vehicle velocity signal SVv and the wheel velocity signal SVw, it can be judged that at least one of the vehicle velocity signal SVv and the wheel velocity signal SVw is in fact suffering from an abnormality.

According to the present embodiment, since a general purpose signal (vehicle velocity signal SVv, wheel velocity signal SVw), which indicates directly whether the vehicle 12 is currently traveling or is currently stopped, is used to determine the traveling/stopped condition of the vehicle 12, a judgment of high reliability can be performed without increasing costs.

Further, since the vehicle velocity signals SVv are output from the FI ECU 24 and the wheel velocity signals SVw are output from the VSA ECU 26, without the need for newly providing a dedicated unit, the vehicle control device 10 can be achieved at a low cost.

(Second Embodiment)

A vehicle 102, which is equipped with a vehicle control device 100 according to a second embodiment of the present invention, will be described below with reference to FIGS. 4 and 5. In the vehicle 102 according to the present embodiment, constituent elements having the same or similar functions and effects to those of the above-described vehicle 12 are denoted by the same reference characters, and detailed description of such features is omitted.

Figure 4:
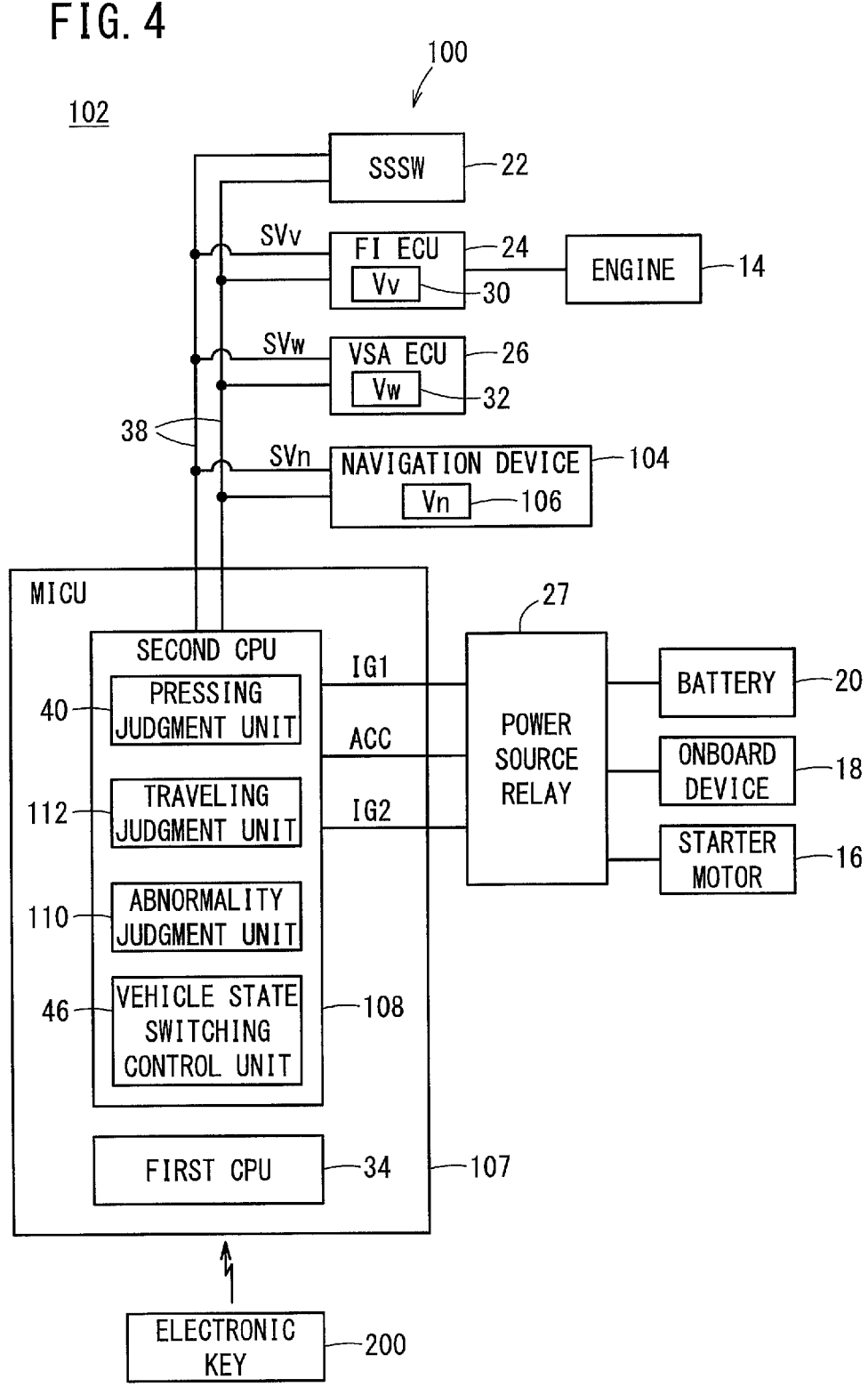
FIG. 4 is a block diagram of a vehicle equipped with a vehicle control device according to a second embodiment of the present invention.

As shown in FIG. 4, the vehicle 102 according to the present embodiment is equipped with a navigation device (unit) 104. Using GPS (Global Positioning System), the navigation device 104 detects the current position of the vehicle 102 and guides the user along a path to a target destination. The navigation device also includes a navigational vehicle velocity detector 106. The navigational vehicle velocity detector 106 calculates the navigational vehicle velocity Vn [km/h] based on the GPS position information of the vehicle 102, and outputs a navigational vehicle velocity signal (traveling judgment signal) SVn corresponding to the navigational vehicle velocity Vn.

A second CPU 108 constituted by a MICU (Multiplex Integrated Control Unit) 107 receives the navigational vehicle velocity signal SVn, which is transmitted through the communication lines 38 from the navigation device 104. In this case, the navigation device 104 transmits the navigational vehicle velocity signals SVn periodically. An abnormality judgment unit 110 determines whether an abnormality is occurring in at least one of the vehicle velocity signal SVv, the wheel velocity signal SVw, and the navigational vehicle velocity signal SVn.

As shown in the following Table 2, the traveling judgment unit 112 determines whether the vehicle 102 is currently traveling or is currently stopped, based on the vehicle velocity signal SVv, the wheel velocity signal SVw, and the navigational vehicle velocity signal SVn.

TABLE 2

| VEHICLE VELOCITY SIGNAL | WHEEL VELOCITY SIGNAL | NAVIGATIONAL VEHICLE VELOCITY SIGNAL | JUDGMENT RESULT |
|---|---|---|---|
| STOP SIGNAL | STOP SIGNAL | STOP SIGNAL | CURRENTLY STOPPED |
| | | TRAVELING SIGNAL | CURRENTLY TRAVELING (FAULT) |
| | | ABNORMAL | CURRENTLY STOPPED (FAULT) |
| | TRAVELING SIGNAL | STOP SIGNAL | CURRENTLY TRAVELING (FAULT) |
| | | TRAVELING SIGNAL | CURRENTLY TRAVELING (FAULT) |
| | | ABNORMAL | CURRENTLY TRAVELING (FAULT) |
| | ABNORMAL | STOP SIGNAL | CURRENTLY STOPPED (FAULT) |
| | | TRAVELING SIGNAL | CURRENTLY TRAVELING (FAULT) |
| | | ABNORMAL | CURRENTLY STOPPED (FAULT) |
| TRAVELING SIGNAL | STOP SIGNAL | STOP SIGNAL | CURRENTLY TRAVELING (FAULT) |
| | | TRAVELING SIGNAL | CURRENTLY TRAVELING (FAULT) |
| | | ABNORMAL | CURRENTLY TRAVELING (FAULT) |
| | TRAVELING SIGNAL | STOP SIGNAL | CURRENTLY TRAVELING (FAULT) |
| | | TRAVELING SIGNAL | CURRENTLY TRAVELING |
| | | ABNORMAL | CURRENTLY TRAVELING (FAULT) |
| | ABNORMAL | STOP SIGNAL | CURRENTLY TRAVELING (FAULT) |
| | | TRAVELING SIGNAL | CURRENTLY TRAVELING (FAULT) |
| | | ABNORMAL | CURRENTLY TRAVELING (FAULT) |
| ABNORMAL | STOP SIGNAL | STOP SIGNAL | CURRENTLY STOPPED (FAULT) |
| | | TRAVELING SIGNAL | CURRENTLY TRAVELING (FAULT) |
| | | ABNORMAL | CURRENTLY STOPPED (FAULT) |
| | TRAVELING SIGNAL | STOP SIGNAL | CURRENTLY TRAVELING (FAULT) |
| | | TRAVELING SIGNAL | CURRENTLY TRAVELING (FAULT) |
| | | ABNORMAL | CURRENTLY TRAVELING (FAULT) |
| | ABNORMAL | STOP SIGNAL | CURRENTLY STOPPED (FAULT) |
| | | TRAVELING SIGNAL | CURRENTLY TRAVELING (FAULT) |
| | | ABNORMAL | CURRENTLY TRAVELING (FAULT) |

The vehicle control device 100 according to the present embodiment is constructed basically as described above. Next, operations of the vehicle control device 100 will be described. The operations of the vehicle control device 100 according to the present embodiment basically are carried out following the procedures of the flowchart shown in FIG. 2, and the judgment concerning the vehicle traveling/stopped condition (step S1 of FIG. 2) is carried out in accordance with the flowchart shown in FIG. 5. Therefore, below, the description concerning the flowchart of FIG. 2 is omitted.

Figure 5:
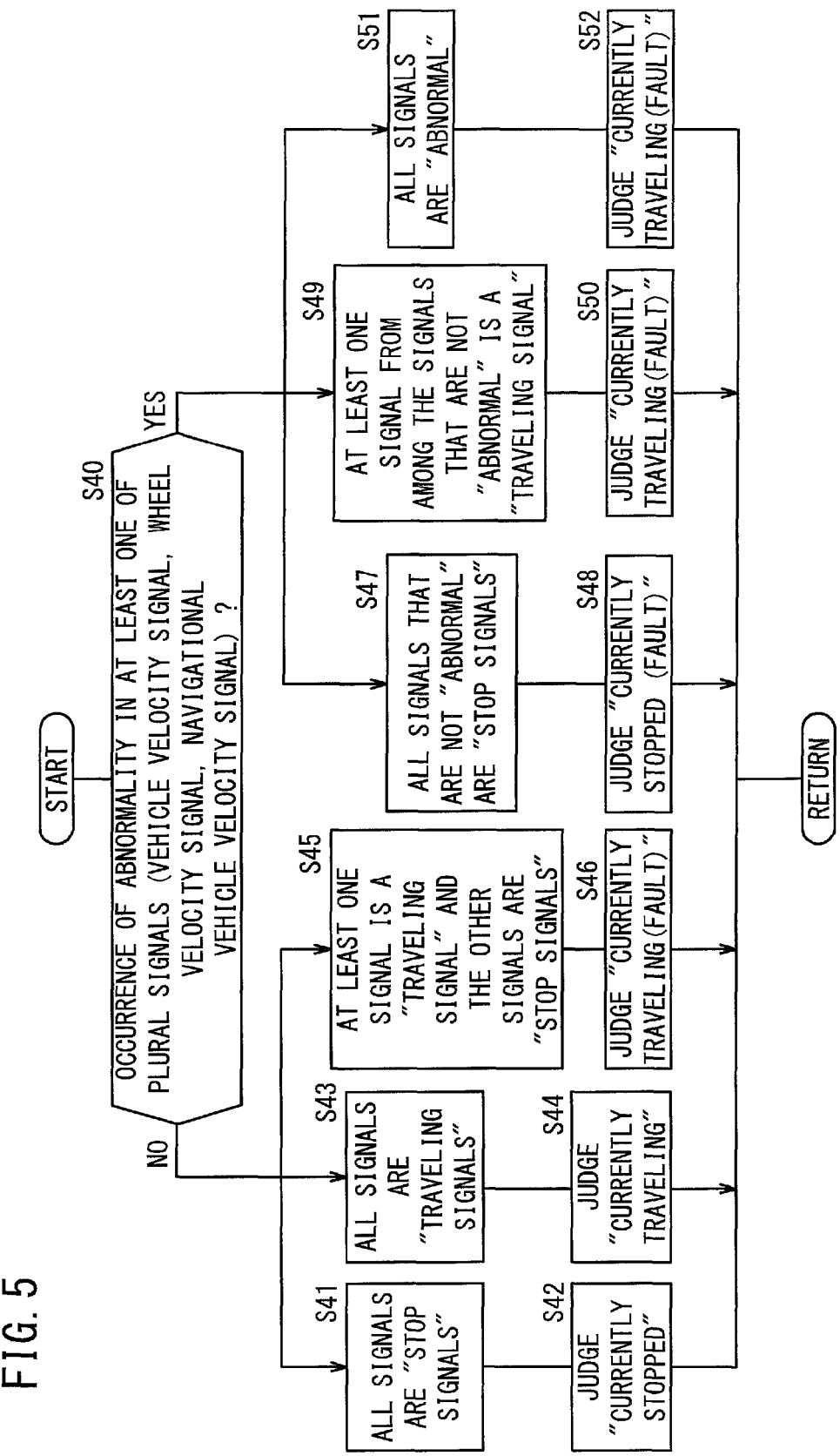
FIG. 5 is a flowchart for describing operations of the vehicle control device of FIG. 4.

At first, the abnormality judgment unit 110 determines whether an abnormality is occurring in at least one of the plurality of signals (the vehicle speed signal SVv, the wheel velocity signal SVw, and the navigational vehicle velocity signal SVn) (step S40 in FIG. 5). In this case, the abnormality judgment unit 110 determines whether an abnormality is occurring in the navigational vehicle velocity signal SVn, based on at least one of periodic updating of the navigational vehicle velocity signal SVn being stopped, periodic transmission of the navigational vehicle velocity signal SVn being disrupted, and the navigational vehicle velocity signal SVn being of an abnormal value. The determinations concerning the vehicle velocity signal SVv and the wheel velocity signal SVw are handled in the same manner.

If it is judged by the abnormality judgment unit 110 that the vehicle velocity signal SVv, the wheel velocity signal SVw, and the navigational vehicle velocity signal SVn are not abnormal (step S40: NO), then the traveling judgment unit 112 determines the traveling/stopped condition of the vehicle 102 in the following manner.

More specifically, in the case that the vehicle velocity signal SVv, the wheel velocity signal SVw, and the navigational vehicle velocity signal SVn are all "stop signals," the traveling judgment unit 112 judges that the vehicle 102 is "currently stopped" (step S41 and step S42). Further, in the case that the vehicle velocity signal SVv, the wheel velocity signal SVw, and the navigational vehicle velocity signal SVn are all "traveling signals," the traveling judgment unit 112 judges that the vehicle 102 is "currently traveling" (step S43 and step S44). Furthermore, in the case that at least one of the vehicle velocity signal SVv, the wheel velocity signal SVw, and the navigational vehicle velocity signal SVn is a "traveling signal" and the others are "stop signals" (in the case that the "traveling signals" and the "stop signals" are mixed), the traveling judgment unit 112 judges that the vehicle 102 is "currently traveling (fault)" (step S45 and step S46).

On the other hand, if it is judged by the abnormality judgment unit 110 that at least one of the vehicle velocity signal SVv, the wheel velocity signal SVw, and the navigational vehicle velocity signal SVn is abnormal (step S40: YES), then the traveling judgment unit 112 determines the traveling/stopped condition of the vehicle 102 in the following manner.

More specifically, in the case that among the vehicle velocity signal SVv, the wheel velocity signal SVw, and the navigational vehicle velocity signal SVn,7 if the signals that are not abnormal are all "stop signals," the traveling judgment unit 112 judges that the vehicle 12 is "currently stopped (fault)" (step S47 and step S48). Further, in the case that at least one of the signals for which an "abnormality" is not occurring from among the vehicle velocity signal SVv, the wheel velocity signal SVw, and the navigational vehicle velocity signal SVn is a "traveling signal," then the traveling judgment unit 112 judges that the vehicle 12 is "currently traveling (fault)" (step S49 and step S50). Furthermore, in the case that all of the vehicle velocity signal SVv, the wheel velocity signal SVw, and the navigational vehicle velocity signal SVn are "abnormal," the traveling judgment unit 112 judges that the vehicle 12 is "currently traveling (fault)" (step S51 and step S52).

According to the present embodiment, the same effects as those of the vehicle control device 10 according to the aforementioned first embodiment are achieved. Further, in the present embodiment, since three signals, i.e., the vehicle velocity signal SVv, the wheel velocity signal SVw, and the navigational vehicle velocity signal SVn, are used, even in the case that two of the signals from among the three signals are "abnormal," if the remaining one signal is a "stop signal," it is determined that the vehicle is "currently stopped." Therefore, even if two from among the vehicle velocity signal SVv, the wheel velocity signal SVw, and the navigational vehicle velocity signal SVn are "abnormal," user convenience can be enhanced when the vehicle 102 is currently stopped.

The vehicle control device according to the present invention is not limited to the above-described embodiments. The traveling judgment signal, which indicates whether the vehicle is currently traveling or is currently stopped, may make use of signals apart from the vehicle velocity signal, the wheel velocity signal, and the navigational vehicle velocity signal, and may make use of four signals or more. Further, in the case that the traveling judgment unit determines that the vehicle is "currently stopped," it may also be provided that at least one of the following conditions, i.e., in which the shift lever is in the park position and the parking brake is being operated, is satisfied. In this case, a judgment that the vehicle is currently stopped even though in actuality the vehicle is currently traveling can be prevented more reliably.

The vehicle control device according to the present invention is not limited to the embodiments described above, and naturally various additional or modified configurations can be adopted therein without departing from the scope of the invention as set forth in the appended claims.

What is claimed is:

1. A vehicle control device disposed in a vehicle, the vehicle comprising a push switch disposed in a vehicle cabin that is operated when pressed by a driver,
the vehicle control device comprising a central processing unit including:
a traveling judgment unit configured to judge whether the vehicle is currently traveling or is currently stopped; and
a vehicle state switching control unit configured to permit an on/off switching control of an onboard device or a start/stop switching control of a drive source of the vehicle by a normal pressing operation of the push switch, if it is judged by the traveling judgment unit that the vehicle is currently stopped, and to prohibit an off control of the onboard device or a stop control of the drive source by the normal pressing operation of the push switch and permit the off control of the onboard device or the stop control of the drive source by a special pressing operation, other than the normal pressing operation, of the push switch set to the push switch, if it is judged by the traveling judgment unit that the vehicle is currently traveling; and
an abnormality judgment unit configured to judge whether an abnormality has occurred among a plurality of traveling judgment signals that are sent respectively from a plurality of units to the traveling judgment unit and which indicate whether the vehicle is currently traveling or is currently stopped;
wherein the traveling judgment unit judges that the vehicle is currently stopped, if it is judged by the abnormality judgment unit that an abnormality has occurred in at least one of the plurality of traveling judgment signals, and all of the traveling judgment signals that have been judged not to be abnormal by the abnormality judgment unit are stop signals indicating that the vehicle is currently stopped, and the traveling judgment unit judges that the vehicle is currently traveling if it is judged by the abnormality judgment unit that an abnormality has occurred in all of the plurality of traveling judgment signals.

2. The vehicle control device according to claim 1, wherein the traveling judgment unit judges that the vehicle is currently traveling if it is judged by the abnormality judgment unit that an abnormality is occurring in at least one signal from among the plurality of traveling judgment signals, and at least one of the traveling judgment signals that has been judged not to be abnormal by the abnormality judgment unit is a traveling signal indicating that the vehicle is currently traveling.

3. The vehicle control device according to claim 2, wherein the traveling judgment unit judges that the vehicle is currently traveling if it is judged by the abnormality judgment unit that an abnormality is not occurring among all of the plurality of traveling judgment signals, and some of the traveling signals indicate a traveling state of the vehicle and some of the traveling signals indicate a stopped state of the vehicle.

4. The vehicle control device according to claim 1, wherein the abnormality judgment unit judges whether an abnormality is occurring in the traveling judgment signals, based on at least one of periodic updating of the traveling judgment signals being stopped, periodic transmission of the traveling judgment signals being disrupted, and the traveling judgment signals being of an abnormal value.

5. The vehicle control device according to claim 1, wherein the plurality of traveling judgment signals includes at least one of a vehicle velocity signal and a wheel velocity signal.

6. The vehicle control device according to claim 1, wherein the plurality of units includes a first electronic control unit that controls the drive source, and a second electronic control unit that controls behavior of the vehicle.

\* \* \* \* \*